United States Patent
Petersen

[15] 3,673,248
[45] June 27, 1972

[54] PRODUCTION OF 1,3,4-DIAZAPHOSPHOLANES

[72] Inventor: Harro Petersen, Frankenthal, Germany

[73] Assignee: Badische Anilin- & Soda-Fabrik Aktiengesellschaft, Ludwigshafen/Rhine, Germany

[22] Filed: Dec. 5, 1969

[21] Appl. No.: 882,711

[30] Foreign Application Priority Data

Dec. 18, 1968 Germany .....................P 18 13 648.6

[52] U.S. Cl. ..........................260/543 PN, 8/115.6, 252/8.1, 260/552 R, 260/553 A, 260/553 R
[51] Int. Cl. .............................................................C07f 9/44
[58] Field of Search ............................................260/543 PN

[56] References Cited

OTHER PUBLICATIONS

Petersen, Justus Liebigs Ann Chem. 726, p. 89– 99 (1969), Q 1L7.
Chem. Abstract V.71.30549U (Abstract of Chem. Ber. 1969, 102(6), 2143–5).
Petersen, Angew Chem. 76, p. 909– 919 (1964), QD1Z5.

*Primary Examiner*—Lorraine A. Weinberger
*Assistant Examiner*—Robert Gerstl
*Attorney*—Johnston, Root, O'Keeffe, Keil, Thompson & Shurtleff

[57] ABSTRACT

Production of 1,3,4-diazaphospholanes by reaction of a N-methylolurea or a N-mercaptomethylurea compound with a phosphorus trihalide, and the new 1,3,4-diazaphospholanes themselves which are flame retardants and starting materials for the production of flame retardants, especially for textiles, surface coatings and plastics.

8 Claims, No Drawings

PRODUCTION OF 1,3,4-DIAZAPHOSPHOLANES

The invention relates to a process for the production of 1,3,4-diazaphospholanes by reaction of N-methylolurea or N-mercaptomethylurea compounds and phosphorus trihalides, and to new compounds of this type.

The invention has for an object a new and simple process for producing a large number of 1,3,4-diazaphospholanes in good yields and purity.

Another object of this invention is the new 1,3,4-diazaphospholanes.

These and other objects are achieved and 1,3,4-diazaphospholanes having the general formula:

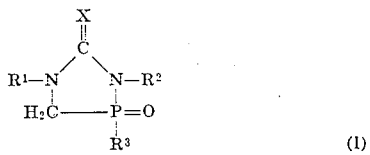

(I)

where the individual radicals $R^1$ and $R^2$ may be identical or different and each denotes an aliphatic, cycloaliphatic, araliphatic or aromatic radical, $R^3$ denotes a halogen atom and X denotes an oxygen or sulfur atom are obtained advantageously by reacting a N-methylolurea or a N-alkoxymethylurea having the general formula:

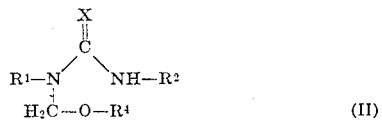

(II)

where the individual radicals $R^1$, $R^2$ and X have the meanings given above and $R^4$ denotes a hydrogen atom or an aliphatic radical with a phosphorus trihalide having the general formula:

(III)

where the radicals $R^3$ have the meanings given above.

When N,N'-dimethyl-N-methoxymethylurea and phosphorus trichloride are used, the reaction may be represented by the following equation:

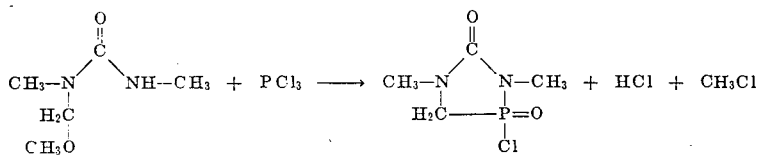

The process according to the invention gives a large number of 1,3,4-diazaphospholanes in good yields and high purity in a simple way.

N-methylol and N-alkoxymethyl compounds of disubstituted ureas and thioureas having the general formula (II) are used as starting materials. Preferred starting materials (II) and consequently preferred end products (I) are those in whose formulas $R^1$ and $R^2$ are identical or different and each denotes an alkyl radical having one to seven carbon atoms, a cycloalkyl radical having five to ten carbon atoms, an aralkyl radical having seven to 12 carbon atoms, or an aryl radical having six to 10 carbon atoms, X denotes an oxygen or sulfur atom and $R^4$ denotes a hydrogen atom or an alkyl radical having one to five carbon atoms. The said radicals may bear, as substituents, groups and/or atoms which are inert under the reaction conditions, for example ether groups or haloalkyl groups having one to four carbon atoms. In the preferred end products (I), $R^3$ denotes a chlorine or bromine atom.

For example the following methylolureas and alkoxymethylureas may be used as starting materials (II):

N,N-dimethyl-N-methylolurea,
N-methyl-N'-butyl-N-methoxymethylurea,
N,N'-diphenyl-N-methoxymethylurea,
N,N'-dimethyl-N-methoxymethylthiourea, and
N,N'-dicyclohexyl-N-pentoxymethylurea.

Further starting materials are phosphorus trihalides having the general Formula (III), preferably phosphorus trichloride or tribromide. Starting materials (II) are reacted with an excess of starting material (III), for example in a ratio of 1 mole of starting material (II) to from 1 to 3 moles of starting material (III), or preferably in stoichiometric amounts.

The reaction is carried out as a rule at a temperature of from −10° to +100° C, preferably from 20° to 60° C, at atmospheric or superatmospheric pressure, continuously or intermittently. It is advantageous to use an organic solvent which is inert under the reaction conditions, such as a chlorohydrocarbon, for example carbon tetrachloride or trichloroethane; an ether, for example dioxane, tetrahydrofuran or diethyl ether; a hydrocarbon, for example heptane, benzene, toluene or xylene; or mixtures of these solvents.

The reaction may be carried out as follows: starting material (II) with or without a solvent is mixed during 5 minutes to one hour at the reaction temperature while stirring with starting material (III) with or without a solvent. The end product is then separated by a conventional method, for example by filtration, with or without concentration of the mixture, and washing and/or recrystallization with a suitable solvent such as acetone or trichloroethane.

The new 1,3,4-diazaphospholanes which can be prepared by the process according to the invention are flame retardants and valuable starting materials for the production of flame retardants, particularly for textiles, surface coatings and plastics. Thus by reaction with ammonia, aminated compounds can be prepared therefrom and cotton cloth can be impregnated therewith in aqueous solution, for example in an amount of 80 to 150 grams per kilogram of fibrous material, dried and thus rendered flameproof. Similarly the said amino compounds may be used together with prior art crease resist, swell resist and shrink resist auxiliaries for flameproofing cellulosic fabrics. The ureidomethyl-phosphonic acids obtained by hydrolysis with water or alkali may be used in an analogous manner.

1,3,4-diazaphospholanes having the general formula:

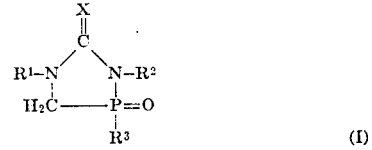

(I)

where the radicals $R^1$ and $R^2$ are identical or different and each denotes an alkyl radical having one to seven carbon atoms, a cycloalkyl radical having five to 10 carbon atoms, an aralkyl radical having seven to 12 carbon atoms, or an aryl radical having six to 10 carbon atoms, X denotes an oxygen or sulfur atom and $R^3$ denotes a chlorine or bromine atom are particularly preferred end products of the process. Examples of such end products are:

2,4-dioxo-1,3-dimethyl-4-chloro-1,3,4-diazaphospholane,
2-thiono-4-oxo-1,3-diethyl-4-chloro-1,3,4-diazaphospholane,
2,4-dioxo-1,3-diphenyl-4-chloro-1,3,4-diazaphospholane and
2,4-dioxo-1,3-dibutyl-4-bromo-1,3,4-diazaphospholane.

The following examples illustrate the invention. The parts specified in the Examples are parts by weight.

EXAMPLE 1

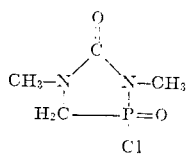

Three hundred ninety six parts of N,N'-dimethyl-N-methoxymethylurea is slowly added to 600 parts of phosphorus trichloride while stirring in a stirred apparatus. Heat of reaction is removed by cooling so that the reaction mixture has a temperature of from 45° to 50° C, the methyl chloride formed thus escaping. After stirring for an hour at 50° C the excess phosphorus trichloride is distilled off at subatmospheric pressure. The residue crystallizes upon cooling. 480 parts of 1,3-dimethyl-2,4-dioxo-4-chloro-1,3,4-diazaphospholane is obtained. This is a yield of 88 percent of the theory. The product may be recrystallized from acetone to purify it. Melting point: 112° to 116° C with decomposition.

Analysis: $C_4H_8O_2N_2PCl$ (182.5); Calculated: C 26.3 H 4.4 O 17.6 N 15.3 P 17.0 Cl 19.4; Found: 26.4 4.8 18.0 15.4 16.6 19.2.

EXAMPLE 2

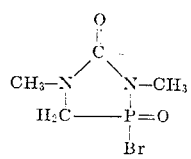

Sixty-six parts of N,N'-dimethyl-N-methoxymethylurea is slowly added with stirring and cooling to a solution of 135.5 parts of phosphorus tribromide in 300 parts of trichloroethane in a stirred apparatus having reflux cooling and a discharge tube at 30° to 35° C. The 1,3-dimethyl-2,4-dioxo-4-bromo-4-bromo-1,3,4-diazaphospholane is precipitated from the mixture in crystalline form. After having been stirred for one hour, the mixture is suction filtered while excluding moisture, the filter cake is washed with a little trichloroethane and dried. Ninety-nine parts of 1,3-dimethyl-2,4-dioxo-4-bromo-1,3,4-diazaphospholane is obtained; this is a yield of 87 percent of the theory. Melting point 103° to 110° C with decomposition.

Analysis: $C_4H_8O_2N_2PBr$ (227); Calculated: C 21.2 H 3.5 O 14.1 N12.3 P 13.6 Br 35.2; Found: 21.3 3.4 14.0 12.1 13.4 35.0.

EXAMPLE 3

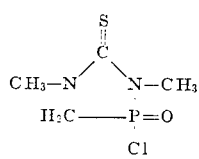

Two hundred parts of phosphorus trichloride is slowly added to 148 parts of N,N'-di-methyl-N-methoxymethylthiourea in 500 parts of dioxane in a stirred apparatus. The reaction mixture is kept at a temperature of 50° to 60° C by cooling. After the phosphorus trichloride has been added, the reaction mixture is stirred for an hour at 50° C. Then the excess of phosphorus trichloride is distilled off with the solvent under subatmospheric pressure. The residue crystallizes upon cooling. One hundred sixty parts of 1,3-dimethyl-2-thiono-4-oxo-4-chloro-1,3,4-diazaphospholane is obtained. This is equivalent to a yield of 80.5 percent of the theory. The product may be recrystallized from dioxane to purify it. Melting point: 88° to 92° C with decomposition.

Analysis: $C_4H_8O_2N_2PSCl$ (198.5); Calculated: C 24.2 H 4.03 O 8.07 N 14.1 P 15.6 S 16.1 cl 17.9; Found: 24.0 4.1 8.2 14.2 15.2 16.3 17.8.

EXAMPLE 4

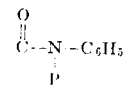

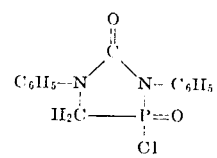

Two hundred and forty-two parts of N,N'-diphenyl-N-methylolurea is added is small portions while stirring to a solution of 200 parts of phosphorus trichloride in 500 parts of toluene. The reaction mixture is then heated for an hour at 50° C and filtered off while excluding moisture. The filter cake is dried. 240 parts of 1,3-diphenyl-2,4-dioxo-4-chloro-1,3,4-diazaphospholane is obtained (78 percent of the theory). Melting point: 105° to 110° C with decomposition.

I claim:

1. A process for the production of 1,3,4-diazaphospholanes having the formula:

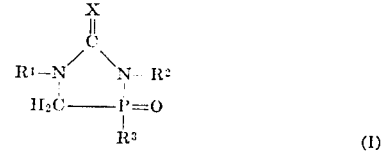

(I)

where the individual radicals $R^1$ and $R^2$ may be identical or different and each denotes an aliphatic, cycloaliphatic, araliphatic or aromatic radical, $R^3$ denotes a halogen atom and X denotes an oxygen or sulfur atom, wherein a N-methylolurea or a N-alkoxymethylurea having the formula:

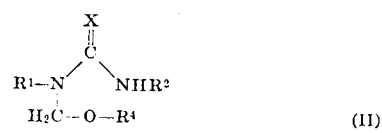

(II)

where the individual radicals $R^1$ and $R^2$ and X have the meanings given above and $R^4$ denotes a hydrogen atom or an aliphatic radical is reacted with a phosphorus trihalide having the formula:

(III)

where the radicals $R^3$ have the meanings given above at a temperature of from −10° to +100° C.

2. A process as claimed in claim 1 carried out at a temperature of from 20° to 60° C.

3. A process as claimed in claim 1 carried out in the presence of an inert organic solvent.

4. A 1,3,4-diazaphospholane having the formula:

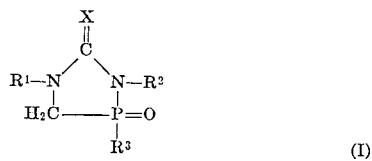

(I)

where the radicals $R^1$ and $R^2$ may be identical or different and each denotes an alkyl radical having one to seven carbon atoms, a cycloalkyl radical having five to 10 carbon atoms, an aralkyl radical having seven to 12 carbon atoms, or an aryl radical having six to 10 carbon atoms, X denotes an oxygen or sulfur atom and $R^3$ denotes a chlorine or bromine atom.

5. 2,4-dioxo-1,3-dimethyl-4-chloro-1,3,4-diazaphospholane.

6. 2-thiono-4-oxo-1,3-diethyl-4-chloro-1,3,4-diazaphospholane.

7. 2,4-dioxo-1,3-diphenyl-4-chloro-1,3,4-diazaphospholane.

8. 2,4-dioxo-1,3-dibutyl-4-bromo-1,3,4-diazaphospholane.

* * * * *

PO-1050
(5/69)

UNITED STATES PATENT OFFICE
CERTIFICATE OF CORRECTION

Patent No. 3,673,248               Dated  June 27, 1972

Inventor(s) Harro Petersen

It is certified that error appears in the above-identified patent and that said Letters Patent are hereby corrected as shown below:

Column 3, line 49, "1,3-dimethyl-2,4-dioxo-4-bromo-4" should read -- 1,3-dimethyl-2,4-dioxo-4 --.

Column 4, line 10, "cl" should read -- Cl --; lines 15 to 18, delete "

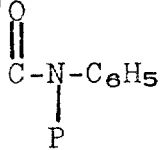

".

Signed and sealed this 9th day of January 1973.

(SEAL)
Attest:

EDWARD M. FLETCHER, JR.                    ROBERT GOTTSCHALK
Attesting Officer                          Commissioner of Patents